Aug. 26, 1941.    C. J. WERNER    2,254,112
REFRIGERATOR CONTROL
Filed Sept. 15, 1938    3 Sheets-Sheet 1

INVENTOR
CALVIN J. WERNER
BY
ATTORNEYS

Aug. 26, 1941.   C. J. WERNER   2,254,112
REFRIGERATOR CONTROL
Filed Sept. 15, 1938   3 Sheets-Sheet 2

INVENTOR
CALVIN J. WERNER
BY
ATTORNEYS

Aug. 26, 1941.   C. J. WERNER   2,254,112
REFRIGERATOR CONTROL
Filed Sept. 15, 1938   3 Sheets-Sheet 3

INVENTOR
CALVIN J. WERNER
BY
ATTORNEYS

Patented Aug. 26, 1941

2,254,112

UNITED STATES PATENT OFFICE 2,254,112

REFRIGERATOR CONTROL

Calvin J. Werner, Dayton, Ohio, assignor to General Motors Corporation, Detroit, Mich., a corporation of Delaware Application September 15, 1938, Serial No. 229,995

16 Claims. (Cl. 200—83)

This invention relates to improvements in controlling devices particularly adapted for use in connection with electrically operated refrigerators or the like.

It is among the objects of the present invention to provide a unitary controlling device for an electrically operated refrigerator, said device operating automatically to effect control of electric circuits in one instance in response to predetermined temperature conditions within the refrigerator, in another, to protect the electrical system of the device against damage by an excessive current flow, and in still another instance provides a manual control for initiating and terminating operation of the device as well as adjusting the automatic temperature control so that the refrigerator will automatically be brought into and out of operation at the desired temperatures.

A further object of the present invention is to provide a control device of simple structure and design for an electric refrigerator, various elements of the device being so constructed and assembled that several of them will act mechanically through another to effect their control, each element, however, being functionally independent from the other.

Further objects and advantages of the present invention will be apparent from the following description, reference being had to the accompanying drawings, wherein a preferred embodiment of the invention is clearly shown.

This unitary controlling device comprises a single housing adapted to be assembled in an electric refrigerator particularly of the household type, and in and on which are mounted the several devices as listed below and which provide control as described;

(A) A switch, which may be termed the "control switch," capable of being actuated to close and open the electric circuit through the starting and running windings of the electric motor which provides the motive power for the compressor of the refrigerator.

(B) A second switch, which may be termed the "light switch," independent of the "control switch" and which is actuated by the opening and closing of the refrigerator door, to close and open, respectively, the circuit through an electric bulb within the refrigerator.

(C) A socket for receiving an electric light bulb for illuminating the interior of the refrigerator.

(D) A thermo-electric reponsive device, shown as an electrical conductor for the "control switch" which is adapted to effect operation of the said "control switch" in accordance with current flow therethrough so that an excessive flow, in case the motor should become stalled, or overloaded and which would tend to burn out or damage the motor, will affect said thermo-electric responsive device causing it to actuate the "control switch" to open the motor circuit. This thermo-electric responsive device is adapted also to actuate the "control switch" to open the circuit through the starting winding only of the electric motor in response to a predetermined interval of heavy current flow through the motor for starting purposes.

(E) A thermo-pressure responsive device actuated by changes of temperature within the refrigerator and, being mechanically connected to the thermo-electric responsive device, is consequently adapted to actuate the "control switch" to open and close the circuit through the electric motor in accordance with such temperature changes within the refrigerator. In this instance the "thermo-electric" device acts merely as a mechanical connection between the "thermo-pressure" device and the "control switch."

(F) A manual control device which has portions rotatable and adapted to act through the "thermo-electric" device mechanically, to actuate the "control switch" for initiating or terminating operation of the electric motor and also to adjust the thermo-pressure device to render it effective to start and stop the refrigerator within the desired range of temperature. The manual control device also has portions not only rotatable, but also longitudinally movable by the refrigerator door being opened and closed, said portion controlling the "light switch" so that it is turned on and off in response to the said opening and closing of the refrigerator door.

Figure 1:
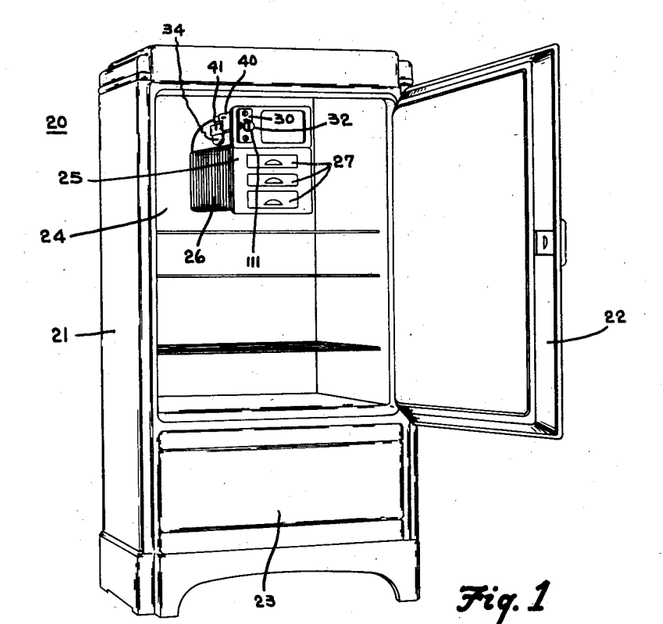
Fig. 1 is a perspective view of a household refrigerator equipped with the present invention.

Referring to the drawings, the numeral 20 designates as a whole an electric refrigerator of the household type, comprising a cabinet 21 provided with a door 22. Within this cabinet are two compartments, the lower compartment shown closed and designated by the numeral 23, in which is positioned the usual compressor, electric motor and other devices making up the refrigerator apparatus.

The upper compartment designated by the numeral 24 includes the freezing unit 25 provided with freezing coils 26 and trays 27.

Figure 2:
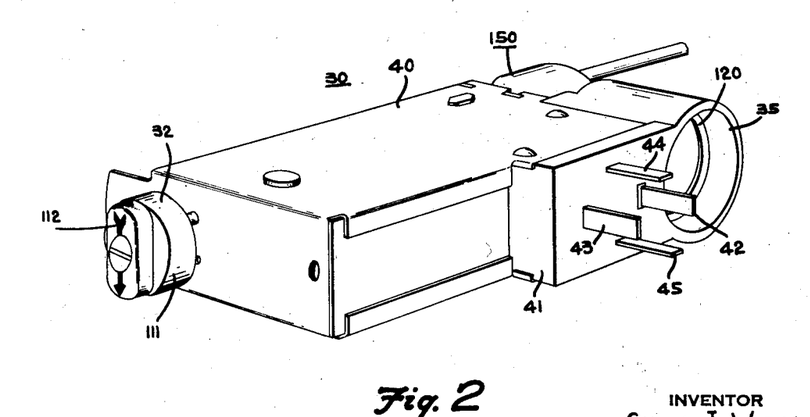
Fig. 2 is a perspective view of the improved controlling device adapted to be assembled within the refrigerator.

The present invention, as has been stated, relates to a control device for an electrically operated refrigerator. This control device, referred to as a whole by the numeral 30 in Fig. 2, is shown applied to the freezing unit 25 of Fig. 1 in such a manner that the control button 32 of the device may be engaged by the door 22 when it is closed and shifted longitudinally into one position, and when the door is opened this control button may again move longitudinally into its normal position. This shifting of the control button 32 from one position into another by the door 22 operates a switch to open and close the circuit through the electric light bulb 34 secured in the socket 35 of the control device, this electric light bulb being provided for purposes of illuminating the interior of the compartment 24 of the refrigerator when the door 22 is opened.

Figures 3, 4, 7, 8, 9, 10:
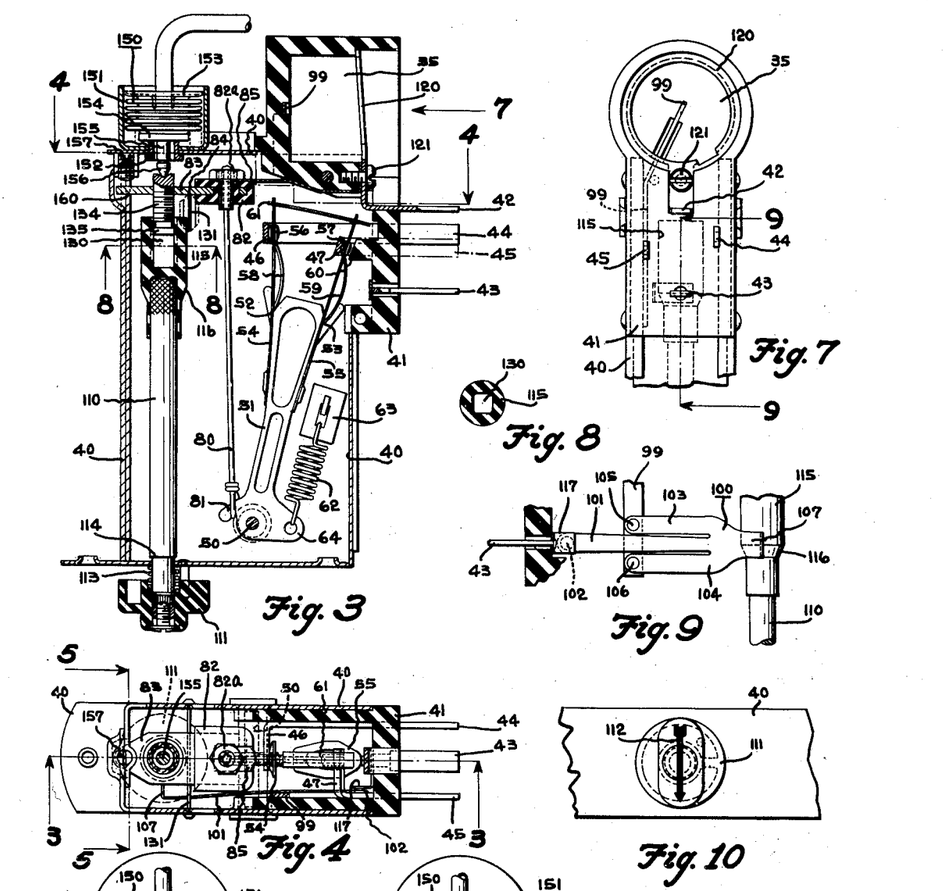
Fig. 3 is a sectional view of the control device taken substantially along the line 3—3 of Fig. 4 certain parts being shown in elevation for the sake of clearness.
Fig. 4 is a fragmentary sectional view taken substantially along the line 4—4 of Fig. 3.
Fig. 7 is a fragmentary view taken in the direction of the arrow 7 of Fig. 3.
Fig. 8 is a fragmentary sectional view taken substantially along the line 8—8 of Fig. 3.
Fig. 9 is a detailed fragmentary view of the light switch portion of the device.
Fig. 10 is a detail view of the control button of the device.

As has been mentioned in the preamble, the unitary controlling device comprises a single housing designated by the numeral 40 in Figs. 2 and 3. This housing has a portion 41, of any suitable insulating material, secured thereto, housing 41 providing the socket 35 adapted to receive the electric light bulb 34 as shown in Fig. 1. Terminals 42 and 43 are provided in this insulating portion 41, these terminals leading to the electric light socket 35.

Two other terminals 44 and 45 are supported by the insulating portion 41 of the casing, these terminals leading into the interior portion of the housing and providing the stationary contacts 46 and 47 respectively of the control switch.

The type of control switch shown in this application is similar in character to that illustrated, described and claimed in the Patent 2,095,570 issued to me on Oct. 12, 1937, and also illustrated, described and claimed in my copending application Serial No. 190,888, filed Feb. 17, 1938. However, for purposes of this application a general description of the switch will be given.

A pin 50 is carried by the housing 40. Upon this pin there is pivotally supported a movable frame 51, in the outer, free edge of which are provided two V-shaped notches 52 and 53. Two leaf spring members 54 and 55 are secured to opposite edges of this frame, these leaf spring members supporting the movable contacts 56 and 57 respectively of the control switch. The leaf spring members are secured to the frame at their lower ends, as shown in the Fig. 3. Integral with these respective leaf spring members are spring portions 58 and 59 biased to urge said members in one direction or the other by having their free ends seated in the V-shaped notches 52 and 53 respectively, the biasing force of said portions depending in their direction upon the position of the frame 51. A stop 60, formed on the insulating portion 41 of the housing, limits the movement of the resilient spring blade 55 in its movement away from its cooperating stationary contact 47. A tie bar 61, provided between the free ends of the resilient spring blade members 54 and 55, is so constructed and arranged that it will limit the movement of the contact carrying spring blade 54 away from its cooperating stationary contact 46. A coil spring 62, interposed between a clamp 63 carried by the housing and a projection 64 on the pivoted frame 51, yieldably urges the frame 51 in a counterclockwise direction as shown in Fig. 3. Under the effect of this spring, as it tends to move the frame 51 in a counterclockwise direction, the spring blade portions 58 and 59 are so biased that they will tend to urge the spring blades 54 and 55 respectively toward the right or in a clockwise direction so that the blade which carries movable contact 57 is urged against its insulating stop 60 and the blade which carries movable contact 56 is also urged in its clockwise direction, this movement being limited, however, by the tie bar 61 interposed between the blades 55 and 54. In this position the movable contacts 56 and 57 of the control switch are disengaged from their cooperating stationary contacts 46 and 47. The switch is so constructed, however, that when a force is applied to the pivoted frame 51 to move it clockwise upon its pivot pin 50 in opposition to the effect of the coil spring 62, the biasing spring portions 58 and 59 are shifted to exert a force upon their respective spring blades 54 and 55 to urge them toward the left as regards Fig. 3, or in a counterclockwise direction, these spring blades shifting and simultaneously causing engagement of their respective contacts 56 and 57 with their respective cooperating stationary contacts 46 and 47, as shown in the Fig. 3. The fulcrum points of the respective spring biasing portions 58 and 59, on the pivoted frame 51, are in such a position of alignment between their respective movable contacts 56 and 57 and the pivotal pin 50, so that as the frame 51 is moved from its full contactmaking position, as shown in Fig. 3, toward the left or counterclockwise, the movable contact 57, carried by spring blade 55, will first be disengaged from its stationary contact 47, then, upon continued movement of the frame 51 in said counterclockwise direction, the disengagement of movable contact 56 from its stationary contact 46 will result. Thus it may be said that the control switch, used in the present instance, comprises a toggle switch having two separate sets of cooperating contacts, operation of the switch to close the contacts resulting in a simultaneous closing of both sets of contacts, while a reverse operation of the switch, to open the contacts, results in a successive opening of the separate sets of contacts, that is, one set of contacts, namely the contacts 47 and 57 will be first disengaged and thereafter the second set of contacts 46 and 56 will be disengaged.

Figure 11:
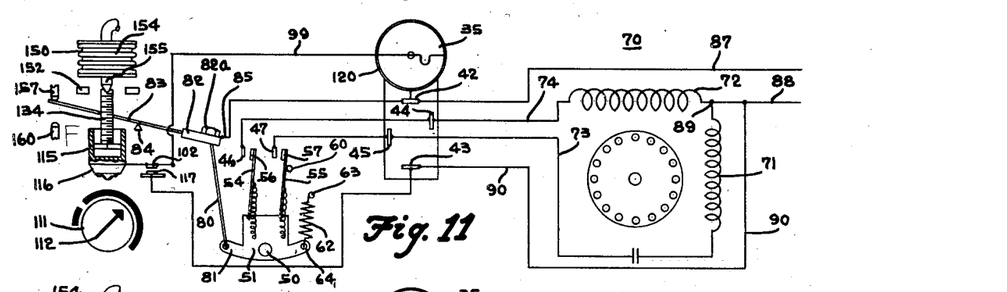
Fig. 11 is a diagrammatic view showing the electrical circuits and connections particularly in their respective positions when the temperature control of the refrigerator has actuated the switch to open the electric circuits.

This type of switch is used to control the circuits of the starting motor, which motor is designated as a whole in the Fig. 11 by the numeral 70 and which comprises the starting winding 71 and the running winding 72. It will be seen that in this circuit diagram of Fig. 11, that the starting winding 71 is connected through the lead 73 with the terminal 45, which, as has been described heretofore, provides the stationary contact 47 adapted to be engaged by the movable contact 57 of the control switch. The running winding 72 of the motor is connected through a lead 74 with the terminal 44, which, as has been described, provides the stationary contact 46, cooperating with the movable contact 56 of the control switch.

The pivoted frame 51 of the control switch has one end of an element 80 anchored to it as at 81. The other end of this element 80 is secured to an insulating block 82 anchored to one end of a lever 83 which is pivoted at 84 on a strap 131 carried by the housing 40. A flexible lead or pigtail 85 is in electrical connection with the adjustable screw 82a for anchoring the element 80 to the insulating block 82 carried by the lever 83. This pigtail 85 is also in electrical connection with the stationary terminal 42, provided on the insulating portion 41 of the housing. Thus the lead 87, which may be termed the power line and which is electrically connected to the terminal 42 as shown in diagrammatic view Fig. 11, is connected also to the element 80, which, as has been described, is anchored to the pivoted frame 51 of the control switch. Therefore this one side of the power line, or the conductor 87, is in electrical connection with the frame 51 of the switch and because movable contact plates 54 and 55 are also connected with the frame, consequently movable contacts 56 and 57 carried by the arms 54 and 55 respectively, are also in electrical connection with the power line 87. The other power line 88 is connected with the starting and running windings 71 and 72 respectively at the point 89, this power line 88 also being connected with the light switch terminal 43, through lead 90.

From the aforegoing it may be seen that when the control switch is moved to its circuit-closing position, at which time its two sets of contacts 46—56 and 47—57 are simultaneously closed, circuits through the starting winding 71 and the running winding 72 are simultaneously completed and thus the electric motor will start to drive the refrigerating apparatus.

Under starting conditions a heavy surge of current flows through these windings. After the motor has started it is unnecessary to maintain a circuit through its starting winding. In the present invention the element 80 which forms a mechanical connection between the pivoted lever 83 and the pivoted switch arm 51, also serves as a thermo-electric responsive device, a heavy surge of current flowing therethrough causing said element 80 to become heated and thus expand, and this expansion permits the spring 62 to become effective to actuate the pivoted switch frame 51 counterclockwise sufficiently to open the first set of contacts of the control switch. This first opening set of contacts has previously been described as including the movable contact 57 and stationary contact 47, and inasmuch as these contacts are the ones that complete the circuit through the starting winding 71, the initial movement of the control switch, under the effect of spring 62, will thus open the starting circuit of the motor. After the motor is running normally and its starting winding is out of the circuit, the current flow under these normal conditions through the element 80 will not cause it to heat up sufficiently to expand any more. Consequently the spring 62 is held inoperative and will not, under normal running conditions, actuate the pivoted frame 51 in a counterclockwise direction, as regards Fig. 3, to effect opening of the second set of contacts, namely 46 and 56, which complete the circuit through the running winding of the electric motor. However, if for any reason the motor should be stalled or overloaded, an increased heating up of the element 80, due to such overload will result, causing a further expansion thereof and thus permitting the spring 62 to again move the switch frame 51 counterclockwise beyond the normal running position so that the second set of contacts 46 and 56 will be disengaged, thus completely breaking the circuit through the running winding of the electric motor and thereby rendering the electric motor completely inoperative. Thus it will be seen that this control switch not only provides a switch adapted to disconnect the starting winding after the motor has attained a sufficient speed for normal running, but it also provides an overload protective device. By completely breaking the circuit through the motor under overload conditions it is protected against any damage or burning out due to such overload.

The element 80 may be termed a thermoelectric responsive device, for, as the current flow therethrough increases, said device will become heated and expand and permit the spring 62 to actuate the switch to open circuit connections and, on the other hand, when the current flow through said element remains normal, it will hold the switch in the proper position for normal running conditions in which the starting circuit is opened and only the running circuit through the switch is maintained.

Figure 5:
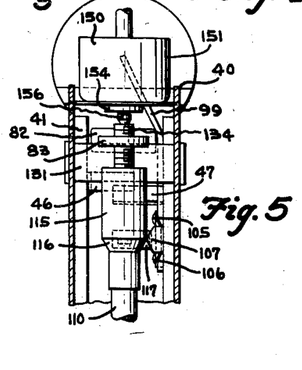
Fig. 5 is a fragmentary sectional view taken in the direction of the arrows 5—5 of Fig. 4.
Figure 6:
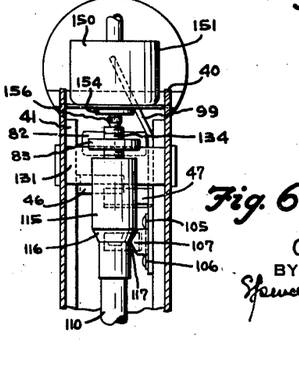
Fig. 6 is a view similar to Fig. 5, certain parts of the control device, however, being moved to a different position.

As has been stated in the paragraph "B" of the preamble, a second switch, termed the "light switch" is provided in the housing of the device. This second switch is entirely independent of the "control switch" just described. Its operation controls the electric lamp 34 contained within the socket 35 and provided for purposes of illuminating the storage compartment 24 of the refrigerator. This switch comprises a resilient spring blade 100 having three spring fingers, the central one of which, 101, carries a contact 102 and is comparatively longer than the two spring fingers 103 and 104 positioned on opposite sides of said central finger. The ends of said spring blades 103 and 104 are secured at 105 and 106 respectively to a metallic conductor 99 attached to the insulating portion 41 of the housing as shown in the Figs. 4, 5, 6 and 7. The end of the spring blade 100, opposite the contact 102 and designated by the numeral 107, is bent into a V-formation as shown in Figs. 5 and 6, this V-formation lying within the path of movement of the manual control device.

The manual control device comprises a rod 110 which extends from the interior of the casing 40 to the outside of said casing, its outer end having the control button 111 secured thereto. This control button 111 is completely shown in the Figs. 3 and 10, the button being provided with an indicator arrow 112. A spring 113 interposed between the button and the housing 40 tends to urge the rod 110 so that its shoulder 114 is normally in engagement with the inner surface of the housing 40, said shoulder forming a stop for the outward, longitudinal movement of the rod 110. The inner end of the rod 110 has a head 115 of insulating material secured thereto. The outer surface of said head 115, adjacent the end of the rod 110 to which it is attached, has a tapering portion 116. When in normal position this tapering portion 116 engages the V-shaped end 107 of the light switch spring blade so that this end is tilted, urging its contact 102 on finger 101 into engagement with the contact 117 provided on the inner end of the terminal 43 which, as has been described, is carried by the insulating portion 41 of the housing. If, however, a push is exerted upon the control button 111, urging the rod 110 inwardly against the effect of spring 113, the tapering portion 116 of the head 115 is moved out of engagement with the V-shaped end 107 of the light switch blade, thus permitting the fingers 103 and 104 to flex the contact carrying arm 101 out of engagement with the contact 117. Inasmuch as the unit is mounted in the path of the refrigerator door 22, as has previously been described, said door when closed will engage the control button 111 to move the rod 110 inwardly and thus actuate the light switch to break the circuit through the light. Inversely when the dood is opened, the rod 110 and its button 111 may assume their normal position under which the light switch is closed and the circuit through the light bulb is completed, providing for illumination of the storage compartment 24.

As has previously been mentioned, metallic strap conductor 99, secured to the insulating portion 41 of the housing, is in electrical connection with the movable contact blade 100 of the light switch. As shown particularly in Fig. 7, this strap 99 extends to the center of lamp socket 35 and thus provides the central terminal for the bulb 34 received by said socket. The outer terminal for the bulb comprises a ring 120 secured in the socket, this ring being formed integral with the terminal 42 as shown in Fig. 3 and being secured to the insulating portion 41 of the housing by the screw 121. Fig. 3 shows also how the pigtail connection 85, having its one end electrically connected to the anchorage screw 82a securing the thermo-electric element 80 to the block 82, has its other end electrically connected to terminal 42 beneath the screw 121.

The manual control device comprises a rod 110 having one end extending outside the housing and carrying the control button 111. This rod also is provided at its inner end with a head 115 of insulating material. Referring to Fig. 3 in particular, this head 115 is provided with a recess 130, the recess being rectangular in shape as shown in the cross section Fig. 8. Any suitable conformation may be used as long as flat surfaces are provided for the purpose to be described.

The housing has a strap 131 extending across it, and providing a fulcrum upon which the lever 83 is pivotally supported as at 84. As has been mentioned, to one end of this lever 83 is secured an insulating block 82, carrying adjustable screw means 82a for anchoring the thermo-electric responsive element to said block. A stud 134 is threadedly received by the lever 83 on the side of its fulcrum point 84 opposite the block 82. The outer end of this stud 134 is slightly recessed, the opposite end having a head portion 135 conforming to the shape of the recess 130 in the insulating head 115. Thus the stud 134 is mechanically connected to the head 115 so that when the head 115 is rotated the stud 134 must necessarily rotate therewith. However, the head 115 may be moved longitudinally relatively to the stud 134 because its threaded portion is of smaller diameter than the transverse dimension of the recess 130. From this it may be seen that the manual control device 110 may be moved longitudinally relatively to the stud 134 without moving it in any manner, thereby permitting the head 115 of said manual control device to control the light switch blade 100 by opening and closing of the refrigerator door, as has been described.

In the paragraph "E" of the preamble, a thermo-pressure responsive device is described, this thermo-pressure responsive device being provided for the purpose of actuating the control switch in accordance with temperature changes within the refrigerator. Any suitable thermo-pressure responsive device may be used for this purpose. However, in the present invention applicant has shown this device in the form of a bellows 150 supported within a cup-shaped member 151 attached to the housing 40 in any suitable manner. The top plate 153 of the bellows is secured to the cup-shaped member 151 so as to be immovable relative thereto. The lower plate 154 of the bellows, however, is movable relative to the housing 151. A spring, not shown, is provided within the bellows, tending to expand it. Secured to the bottom plate 154 of the bellows is a nipple 155 having a pointed outer end 156 seating in the outer recessed end of the stud 134 which is threadedly carried by the lever 83. A collar 152 threaded to the housing 40 provides an adjustable stop or abutment for the bottom plate 154 of the bellows to limit the expansible movement of said bellows. This collar 152 may be moved to vary the position of this abutment. A screw 157 is supported in the housing and provides an adjustable stop for the upward tilting movement of the left arm of lever 83 as regards Fig. 3. The nipple 155 engaging the threaded stud 134 thus provides an abutment for said threaded stud so that when it is rotated it will move or tilt the lever 83 instead of itself moving relatively to said lever.

This thermo-pressure responsive device is so constructed and arranged that its bellows portion 150 will contract in response to lowering temperatures within the refrigerator, thus moving the nipple 155 upwardly in a direction away from the threaded stud 134, while on the other hand in response to increasing temperatures within the refrigerator said bellows will expand, urging its nipple 155 toward and against the threaded stud 134 to tilt the left end of the lever 83 downwardly.

Various cycles in the operation of applicant's control device will now be described. In the diagrammatic Fig. 14 the system is shown in its normal "off" position. Here the refrigerator, being comparatively warm, will cause the bellows 150 to be fully expanded so that its lower plate 154 engages and rests upon the adjustable abutment 152. Lever 83 is tilted so that its left end is in engagement with the adjustable stop screw 157 and is farthest positioned from the opposite stop 160, provided by the edge of an opening in the side wall of the housing 40, into and through which the lever 83 extends. In this normal position the movable contacts 55 and 56 of the control switch are out of engagement with their cooperating stationary contacts 46 and 47 respectively, due to the effect of spring 62 upon the movable frame 51 of said control switch, the thermo-electric responsive element exerting no pull upon said frame under these conditions. Now, when the user desires to start the refrigerator, he will open the door 22 permitting the manual control device rod 110 to move longitudinally outwardly under the effect of spring 113 so that the control button 111 moves away from the housing of the device. This causes the insulating head 115 of the rod 110 to move longitudinally relatively to the screw threaded stud 134 and in so moving the tapered portion 116 of said insulating head 115 will engage and move the spring contact 100 of the light switch so that its contact element 102 on finger 101 is caused to engage the contact 117 connected to terminal 43. Now the circuit is closed through the illuminating light bulb 34 in socket 35 as follows: from the power line 87 to the terminal 42 forming also the outer ring terminal for the lamp socket, thence through the lamp to the central terminal of said lamp, engaging central terminal 99 of the lamp socket, thence to the contact 102 of the light switch to its cooperating contact 117 which is electrically connected to the terminal 43, thence through lead 90 to the opposite side of the power line 88. The interior of the refrigerator is now illuminated.

Figure 12:
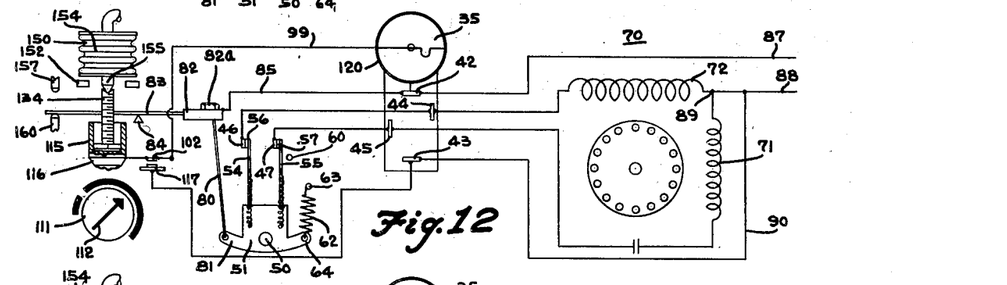
Fig. 12 shows the circuit connections diagrammatically when completed for starting purposes.
Figure 14:
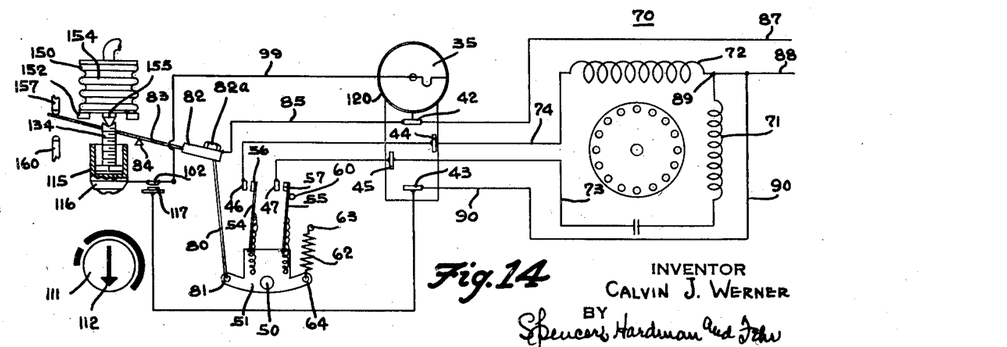
Fig. 14 diagrammatically shows the electrical circuits when the switch has been actuated manually to open all the circuits.

To initiate the operation of the refrigerator the user now turns the control button 111 clockwise as regards Figs. 1 and 14, or to the right as regards Figs. 3 and 10. This turning of the control button to the right will likewise cause a turning of the threaded stud 134 to the right by its threaded engagement with the lever 83. Due to the threaded stud 134 engaging nipple 155 of the bellows, threaded stud 134 will not move longitudinally relatively to the manual control device, but will, in rotating relative to the lever 83, cause it to be tilted left end downwardly thus raising its right end and exerting a pull upon the thermo-electric responsive element 80, anchored to the right end of the lever 83 through the insulating block 82. This tilting of the lever 83 continues until its left end engages the stop 160 provided by the housing. Tilting lever 83 and exerting a pull upon the element 80, now acting merely as a mechanical connection between the lever 83 and the pivoted frame 51 of the control switch, will cause a movement of the control switch frame 51 in a clockwise direction as regards Figs. 3 and 4. At a predetermined point of this movement of the frame 51 clockwise, the biasing spring portions 58 and 59 thereof will be positioned, suddenly to throw their respective contact-carrying blades 54 and 55 in a counterclockwise direction as regards Fig. 3, so that the movable contacts 56 and 57 carried by said blades 54 and 55 respectively, will simultaneously engage their respective stationary contacts 46 and 47. This position of the lever 83 and its block 82 as well as frame 51 of the control switch and its movable contact blades 54 and 55 is illustrated in the diagrammatic Fig. 12 showing the movable contacts 56 and 57 engaging their respective stationary contacts 46 and 47. Now the circuits through the starting and running windings 71 and 72 respectively of the motor 70 are completed in the following manner: Current flowing from the main power line 87 enters terminal 42, then flows through pigtail connection 85 to the thermo-electric responsive element 80, thence to the movable frame 51 of the control switch, from which the current will enter both movable contact spring blades 54 and 55 to the respective movable contacts 56 and 57 carried thereby. Current flowing from contact 56 will enter its cooperating stationary contact 46, flow through the terminal 44 to the running winding 72 which is connected to the opposite power line 88 at the point 89. Current flowing through movable contact 57 will enter its cooperating stationary contact 47, flow to the terminal 45, thence through the lead connections to the starting winding 71, which, like the running winding 72 is connected to the opposite power line 88 at the point 89.

A heavy surge of current flow through the motor will now result and the motor will start to rotate. After a predetermined interval of this heavy starting current through the motor and particularly through the thermo-electric responsive element 80, this element 80 will become heated, such heat resulting in an expansion or lengthening of said element. As this element 80 lengthens it permits spring 62 to become effective to move the contact carrying frame 51 of the control switch counterclockwise as regards Fig. 3. It may at this point be mentioned that the element 80 is so designed that its expansive temperature, where movement of the frame 51 is permitted in a counterclockwise direction, is reached only after the motor has operated a predetermined interval, sufficient to attain a speed for ordinary running purposes. Now as the spring becomes effective to move the contact frame 51 counterclockwise, a point in the travel of this frame 51 will be reached where the biasing spring 59 will exert a force upon the blade spring 55 to urge it clockwise, moving the contact 57 thereon out of engagement with its stationary contact and against the stop 60 provided by the insulating portion 41 of the housing. Now the starting winding 71 is rendered ineffective for its circuit is broken by the separation of contacts 57 and 47. Under ordinary running conditions the current flow through the thermo-electric responsive element 80 from the running winding 72 is sufficiently low so that said thermo-electric responsive element 80 will not become sufficiently heated to cause further expansion and permit the spring 62 to continue moving the frame 51 counterclockwise, resulting in a separation of the contacts 46—56 of the running winding.

The thermo-electric responsive element 80 not only acts to operate the switch frame 51 to render the starting winding ineffective during the running operation of the refrigerator, but it also provides an overload protective device which, in case the electric motor becomes overloaded or stalls, will break all its circuit connections, thereby protecting it against damage or completely burning out due to such overload. If under any circumstances the motor should be stalled or become overloaded, the excess current flow through the element 80 will cause it to become further heated, resulting in a further expansion thereof which will permit spring 62 to move the frame 51 counterclockwise sufficient to permit biasing spring 58 to reach a point in which it will suddenly urge its contact carrying blade 54 in a clockwise direction to move its contact 56 out of engagement with the cooperating contact 46. This movement clockwise of the blade, carrying contact 56, is limited by the tie bar 61 interposed between the contact blades 55 and 54. Thus when both contacts 57 and 56 are out of engagement with their respective contacts 47 and 46, no current is directed to or may flow through the electric motor. Naturally, if such a condition is permitted to exist without attention, the element 80 will cool off, contract and against the effect of spring 62 will again move frame 51 clockwise, resulting in a simultaneous engagement of contacts 56 and 57 with their respective contacts 46 and 47. However, if the overload condition still exists, thermo-electric responsive element will again become heated, expand and permit spring 62 to move frame 51 counterclockwise, again resulting in a successive breaking of the contact elements 57—47 and 56—46 and a complete disconnection of the electric motor. This of course will be repeated until the proper care has been taken to remove the cause of the excessive current flow.

As has been said heretofore, the control switch is actuated in accordance with the temperature within the refrigerator by a thermo-pressure responsive device which includes the bellows 150. This bellows contracts with decreasing temperatures and expands with increasing temperatures. In a normal position as shown in Fig. 14, the bellows is greatly expanded, resting upon the abutment collar 152. After the refrigerator has been operating a sufficient length of time to reduce the temperature within the storage compartment 24 of the refrigerator, the bellows will start to contract and move upwardly so that its bottom plate 154 together with the nipple 155 attached thereto will be moved upwardly in a direction away from the lever 83. Spring 62 exerting a pull on the control switch plate 51, to which the thermo-electric responsive element 80 is attached, will consequently exert a pull on this element 80, said pull being transmitted to the lever 83, causing it to tilt to follow the upward movement of the nipple 155. At a predetermined point this tilting of the lever 83 downwardly at its right end regarding Fig. 3 will permit the spring 62 to move contact carrying frame 51 of the control switch sufficiently to cause disengagement of the movable contact 56 of said switch from its cooperating stationary contact 46 and thus break the running circuit of the motor, terminating refrigeration operation. It will be understood that the starting circuit across the contacts 47—57 has previously been broken after the starting of the motor has been completed, as has been described heretofore. Now the refrigerating apparatus has been stopped and refrigeration terminated, for the temperature within the storage compartment 24 of the refrigerator has reached the predetermined low degree at which the thermo-pressure responsive device has been set.

As the temperature in the storage compartment 24 of the refrigerator rises and when it reaches a predetermined high degree, the bellows, expanding with such a rise in temperature, will cause a downward movement of its bottom plate 154 and its attached nipple 155, causing tilting of the lever 83 by engaging the screw stud 134 thereon so that its right end as regards Fig. 3 is again raised, exerting a pull on the thermo-electric responsive element 80, now merely acting as a mechanical connection between lever 83 and the movable contact carrying frame 51 of the control switch. At a predetermined point of the movement of the frame 51 clockwise in response to the pull by element 80 and lever 83, it will cause simultaneous shifting of contacts 54 and 55, carried by said frame, into simultaneous engagement with their respective stationary contacts 46 and 47 to initiate refrigeration operation. This phase of the operation is clearly illustrated in the diagrammatic view shown in Fig. 12 where the contacts are in starting position, while in Fig. 13 the circuit shows the various element in the normal running position.

Figure 13:
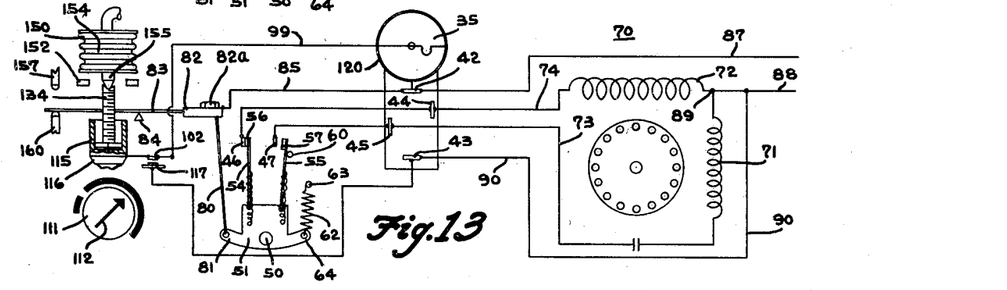
Fig. 13 shows the electrical circuits during normal running operation.

In the paragraph "F" of the preamble the manual control device is defined. This device has a three-fold purpose, as follows (1) When it is moved longitudinally relatively to the screw-threaded stud 134 it has no effect whatsoever upon the control switch, but this manner of operating the manual control actuates the light switch to bring the illuminating electric light bulb 34 of the refrigerator into and out of its circuit with the opening and closing of the refrigerator door respectively. (2) When the manual control is actuated in another manner, or more specifically when it is rotated from its normal "off" position its first function is to turn the screw-threaded stud 134, which in turn tilts the lever 83 from its normal position as shown in Fig. 11 to another position as shown in Figs. 12 and 13. In this position the lever 83 has exerted a pull upon the thermo-electric responsive element 80, acting merely as a mechanical connection between the lever and frame 51 of the control switch, to effect movement of the frame 51 so that the movable contacts thereof engage their respective stationary contacts as shown in Fig. 12. Thus the initial rotation of the control button 111 initiates refrigeration operation by acting through the lever 83 and the thermo-electric responsive element 80 as a mechanical connection to actuate the control switch.

When it is desired to lower the range of temperatures within the refrigerator, that is, when lower temperatures are to be provided within the refrigerator storage compartment 24, the manual control device is rotated beyond its normal starting position so that the threaded stud 134 is rotated in the lever 83, now engaging the stop 160, which will cause the stud to move upwardly in the lever and consequently raising the nipple 155 of the bellows to compress said bellows. Thus the thermo-pressure responsive device is adjusted so that it will actuate the control switch and maintain a lower temperature within the storage compartment 24 of the refrigerator. Being partially compressed and so held, it will naturally start the refrigerator operation at a lower temperature within the refrigerator than it would if it were fully expanded, and thus the refrigeration operation will be initiated at a lower temperature within the box than if a normal adjustment of the thermo-pressure responsive device were made at which the bellows is fully expanded.

From this description it may readily be seen that the manual control device is adapted mechanically to actuate the control switch, acting through the thermo-electric responsive element, which in this instance provides merely a mechanical connection between the manual control device and the control switch. It also may be actuated to adjust the thermo-pressure responsive device so that it will maintain lower temperatures within the storage compartment 24 of the refrigerator if desired and it also may be actuated by the refrigerator door to control the illuminating light bulb within the refrigerator.

The thermo-pressure responsive device is mechanically connected with the control switch through the thermo-electric responsive element acting as a mechanical connection and is adapted to actuate said control switch in accordance with temperature conditions within the refrigerator compartment 24.

The thermo-electric responsive element 80, acting at times as a mechanical connection for the manual control device and the thermo-pressure responsive device is adapted also individually to act as a thermo-electric responsive element in response to current flow therethrough to control starting of the electric motor and during normal running operation provides an overload protective device which will completely break all circuits to the electric motor when it is overloaded or becomes stalled, under which circumstances excessive current flow will tend to burn it up or damage it.

Consequently it may readily be said that applicant has provided a control device for an electric refrigerator, various elements of the device being so constructed and arranged that several of them, for instance the manual control device and the thermo-pressure responsive device will act mechanically, through another, viz: the thermo-electric responsive device, to effect their control over the control switch. Each element, however, is functionally independent of the other, for each can in its own way actuate the control switch to control refrigerator operation without depending upon the peculiar function of the other. However, all depend upon the manual means to start operation initially.

The light switch and socket are not necessary elements in the refrigerator control device, for the manual control device, the thermo-pressure responsive device and the thermo-electric responsive device all could act in the desired manner upon the control switch without provision of the light switch and its socket. However, inasmuch as an illuminating lamp within the refrigertor is highly desirable, applicant has by ingenious construction combined elements necessary to support and control the illuminating light bulb with the elements of the refrigerator control device.

While the embodiment of the present invention as herein disclosed, constitutes a preferred form, it is to be understood that other forms might be adopted, all coming within the scope of the claims which follow.

What is claimed is as follows:

1. A circuit controlling device comprising in combination, a switch; a thermo-electric means for controlling the switch; and thermo-pressure means operatively connected to the thermo-electric means for moving it bodily to control the switch.

2. A circuit controlling device comprising in combination, a switch; a thermo-electric means for controlling the switch; thermo-pressure means operatively connected to the thermo-electric means and adapted to move it bodily to control the switch; and manual means for moving the thermo-electric means to operate the switch.

3. A circuit controlling device comprising in combination, a switch; a thermo-electric means for controlling the switch; thermo-pressure means operatively connected to the thermo-electric means for moving it to control the switch; and manual means cooperating with the thermo-pressure means for bodily moving the thermo-electric means to control the switch.

4. A circuit controlling device comprising in combination, a switch; a thermo-electric means for controlling the switch; thermo-pressure means operatively connected to the thermo-electric means for moving it to control the switch; and manual means engaging the thermo-pressure means and adapted to actuate the switch by moving the thermo-electric means.

5. A circuit controlling device comprising in combination, a switch; a thermo-electric means; a manually operable means, a thermo-pressure means, a member mechanically connecting the manually operable means and the thermo-pressure means to the thermo-electric means for moving the last mentioned means manually or in response to varying pressures to actuate the switch.

6. A circuit controlling device comprising, in combination, a switch; a thermo-electric device; a manual device; and a thermo-pressure device, one of said devices being anchored to the switch, the other two of said devices cooperating with each other to move the said one device bodily to control the switch.

7. A circuit controlling device comprising in combination, a switch; a thermo-electric means; and a thermo-pressure means, one of said means being directly anchored to the switch, the other means being mechanically connected to said one means and being adapted to move said one means bodily to control the switch.

8. A device according to claim 7 in which a manually operable member is adapted to move both of the means to control the switch.

9. A circuit controlling device comprising in combination, a switch; a pivoted lever; a thermo-electric responsive means connected between the lever and the switch for controlling the switch; and thermo-pressure means adapted to actuate the lever and bodily move the thermo-electric responsive means to control the switch.

10. A circuit controlling device comprising in combination, a switch; a pivoted lever; a thermo-electric responsive element providing the sole connection between the switch and said lever and being adapted to control said switch in accordance with current flow therethrough; a thermo-pressure device providing an adjustable abutment for said lever and adapted to actuate the lever to effect control of the switch; and manual means for adjusting said thermo-pressure device and effecting manual control of the switch.

11. A circuit controlling device comprising in combination, a switch; a pivotally supported lever; thermo-electric responsive means operatively connecting the lever with the switch and adapted to effect opening and closing of said switch in accordance with the flow of current through said means; means adjustably carried by the lever; a thermo-pressure device engaging said last mentioned means and adapted to tilt the lever and effect actuation of the switch through the thermo-electric responsive means; and a manually operated member engaging the said last mentioned means and adapted to adjust it relatvely to the lever to tilt the lever also to effect opening and closing of the switch and to adjust the thermo-pressure device to vary its control of the switch.

12. A circuit controlling device comprising, in combination, two separate and independent switches; a thermo-electric responsive means adapted, in response to current flow therethrough, to open and close one of said switches; a thermo-pressure device adapted to act through the thermo-electric means to control said one switch; and means manually operable in different manners and adapted when operated in one manner to act through the thermo-electric means to open and close one switch and also to adjust the thermo-pressure device and when operated in the other manner to open and close the other switch.

13. A circuit controlling device comprising, in combination, two separate and independent switches; a thermo-electric responsive means connected to the one switch and adapted to open and close it in accordance with the flow of current therethrough; a pivoted lever having one end of the thermo-responsive means secured thereto; a stud threadedly engaging said lever; a thermo-pressure device engaging the stud and adapted to control the said one switch by acting through the lever and thermo-electric means; and a manually operable member connected to the stud so as to be capable of rotating it but being movable longitudinally relatively thereto, said member when rotated, controlling the said one switch through the lever and thermo-electric means and also adjusting the thermo-pressure device to vary its control of the said switch, said member when moved longitudinally, opening and closing the other of the two separate switches.

14. A circuit controlling device comprising, in combination, means adapted to close two separate circuits simultaneously and to open said circuits sequentially; thermo-electric means adapted, in response to current flow therethrough, to actuate the first mentioned means to open or close said separate circuits; and thermo-pressure means, acting through said thermo-electric means, for controlling said separate circuit making and breaking means in accordance with temperature changes.

15. A circuit controlling device comprising, in combination, two separate sets of cooperating movable and stationary contacts; a pivoted frame supporting the movable contacts and adapted to actuate them simultaneously when the frame moves in one direction and sequentially when said frame moves in the opposite direction; thermo-electric means adapted, in response to current flow therethrough, to actuate the frame in said opposite direction; resilient means adapted to actuate the frame in said one direction; and thermo-pressure means acting mechanically through the thermo-electric means for operating the frame in accordance with temperature changes and in said opposite direction.

16. A circuit controlling device comprising, in combination, two separate sets of cooperating movable and stationary contacts; a pivoted frame carrying the movable contacts being adapted, when moving in one direction, to actuate the movable contacts simultaneously to engage their respective stationary contacts and when moving in the other direction, to cause said movable contacts sequentially to disengage their respective stationary contacts; resilient means urging the frame in the contact disengaging direction; thermo-electric means normally opposing said resilient means and holding said frame in contact-engaging position, said thermo-electric means being adapted, in response to current flow therethrough to render the resilient means effective sequentially to disengage the sets of contacts; and thermo-pressure means, acting mechanically through said thermo-electric means to actuate the frame to control the sets of contacts in accordance with temperature variations.

CALVIN J. WERNER.